United States Patent [19]

Sachs et al.

[11] 3,896,267

[45] July 22, 1975

[54] TELECOMMUNICATIONS SYSTEM FOR THE HEARING IMPAIRED UTILIZING BAUDOT-ASCII CODE SELECTION

[75] Inventors: Reynold Sachs, McLean, Va.; Frank Cicchiello, Norristown, Pa.

[73] Assignee: Phonics Corporation, Silver Spring, Md.

[22] Filed: Sept. 21, 1973

[21] Appl. No.: 399,553

[52] U.S. Cl...... 179/2 TV; 340/324 AD; 179/2 DP; 178/26 A

[51] Int. Cl. .......... H04h 11/06

[58] Field of Search.... 178/17 R, 17 A, 17 C, 26 A, 178/17.5; 340/365 S, 324 AD; 179/2 DP, 2 TV

[56] References Cited

UNITED STATES PATENTS

| | | | |
|---|---|---|---|
| 2,724,739 | 11/1955 | Harris | 178/26 A |
| 3,457,368 | 7/1969 | Houcke | 178/17 R |
| 3,701,856 | 10/1972 | Stuck | 178/26 A |
| 3,711,646 | 1/1973 | Vermilion | 179/2 DP |
| 3,746,793 | 7/1973 | Sachs | 179/2 DP |
| 3,803,592 | 4/1974 | Hatley | 340/365 S |

*Primary Examiner*—Kathleen H. Claffy
*Assistant Examiner*—Thomas D'Amico
*Attorney, Agent, or Firm*—Morris Liss

[57] ABSTRACT

A data terminal has a keyboard capable of encoding data. A switch determines whether a diode matrix will encode keyboard entries in Baudot or ASCII code. A modem couples the encoded keyboard data to telephone lines for transmission to another terminal station. Data may be received by the terminal in either Baudot or ASCII code. The received data is translated to alpha-numeric video signals that may be displayed on a conventional television receiver.

9 Claims, 6 Drawing Figures

TELECOMMUNICATIONS SYSTEM FOR THE HEARING IMPAIRED UTILIZING BAUDOT-ASCII CODE SELECTION

FIELD OF THE INVENTION

The present invention relates to telecommunications data terminals, and more particularly, to a terminal capable of communicating in either Baudot or ASCII codes.

BRIEF DESCRIPTION OF THE PRIOR ART

The present invention is an improvement of our prior U.S. patent appliation, Ser. No. 279,228 now U.S. Pat. No. 3,746,793. Our previous invention was directed to the utilization of a telecommunication data terminal that permitted two communicating stations to generate data messages by keyboard entries, and receive data messages for display on a conventional TV receiver. The previous invention had circuitry which translated received signals to RF so that an output from the terminal could simply be clipped to the antenna of a TV receiver, where the data was displayed. As a result, an inexpensive visual display was available to the hearing impaired.

The previous invention was a marked improvement over Teletypewriters that have been used by the hearing impaired for some years. Use of the Teletypewriter causes inconveniences and disadvantages. For example, operation of the Teletypewriter in the home creates annoying noise for those who have normal hearing. Out prior invention obviated that problem by substituting a silent video display for the noisy Teletypewriter print out. Other advantages of our prior telecommunication system are explained in detail, in the referenced patent application.

Although our prior invention operates very satisfactorily, it is only capable of communicating in one code. In the previously described invention, the code was ASCII. As a result, all communicating stations require data terminals that communicate in this code. As a practical matter, a large number of stations are equipped with Teletypewriters that communicate in the Baudot code. Accordingly, it is desirable to improve our previous invention so that a particular station has a data terminal available which is compatable with both codes. It is the primary object of the present invention to satisfy this requirement.

BRIEF DESCRIPTION OF THE PRESENT INVENTION

The present invention satisfies this requirement by including circuitry that is capable of handling dual level codes, specifically Baudot and ASCII. However, it is to be understood that the concept of the invention is equally applicable to other codes.

A further advantage of the present invention is the inclusion of an indicator that signifies the approach to the end of a line that is being entered on the keyboard. In this respect, the indicator is similar to the warning bell on a conventional typewriter.

A further object of the invention is the inclusion of a circuit that senses the ringing of a telephone at a receiving station to inform a receiving party that he is being called. Th indicating circuitry is connected to a convenient alert indicator, such as a flashing house lamp. This visually alerts a deaf person that his phone is ringing. Once he recognizes this, he may lift the telephone receiver, place it on an acoustic coupler, included in the telecommunications terminal and receive and communicate with the calling party.

A further object of the present invention is the inclusion of a utilization monitor that measures elapsed time for terminal use. A counter in the terminal meters the elapsed time and further circuitry permits the transmission of an elapsed time count to a central station.

The above-mentioned objects and advantages of the present invention will be more clearly understood when considered in conjunction with the accompanying drawings, in which:

DETAILED DESCRIPTION OF THE INVENTION

Figures 1, 2:
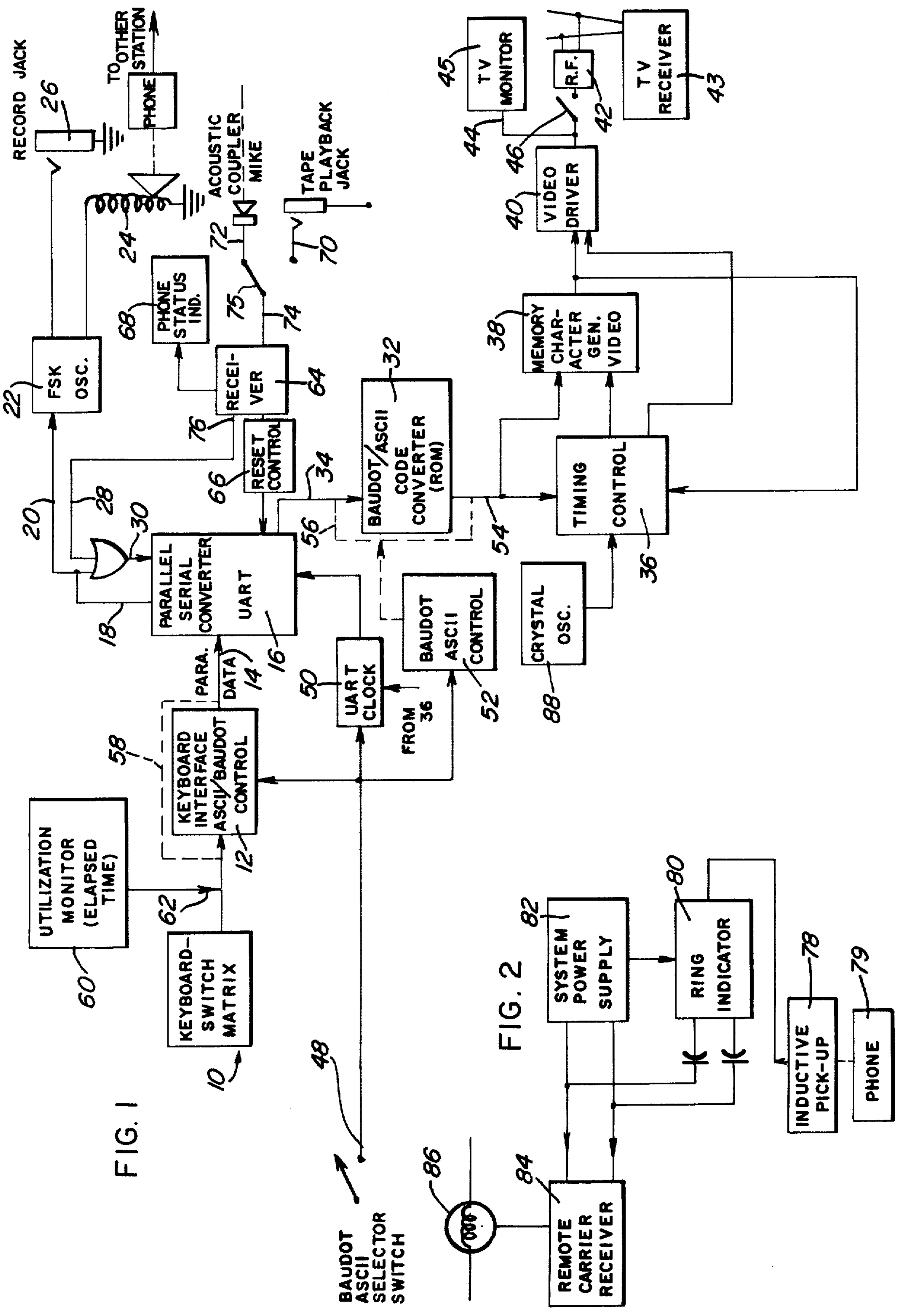
FIG. 1 is a schematic block diagram of the data terminal that is the present invention.
FIG. 2 is a schematic block diagram of an inductive telephone bell pickup and indicator.

Referring to the figures, and more particularly FIG. 1 thereof, a block diagram of the invention is shown. A keyboard 10 permits the manual entry of data by the terminal operator. The keyboard 10 is of the conventional type and is comprised of a plurality of single pole switches that respectively correspond to respective alpha-numeric characters.

As will be explained in greater detail later, the keyboard 10 includes a switch matrix which converts a manually depressed switch on the keyboard to a five level Baudot code when Baudot communication is selected.

With the Baudot/ASCII switch 48 set in the Baudot position, the keyboard interface 12 is interposed at the output of the keyboard-switch matrix 10. The interface 12 determines whether the key being actuated is an alpha or a numeric character. A comparison is made within the interface 12 to determine whether there has been a change from alpha to numeric or vice-versa. If such a change has occurred between the present character and the last entered character, the interface generates a special code indicating this occurrence. This alpha-numeric change code is required by certain receiving data terminals, such as earlier models of the Teletypewriter that employ Baudot code. In compliance with conventional noman clature, these alpha-numeric changes are referred to as figure and letter shifts. When an alpha-numeric change occurs, data transmission from the block 10 is disabled temporarily, and a distinct code is inserted in the data stream along lead 14. The special code appearing on this lead will conform with the Baudot code and will signify a figure shift, letter shift, or a line feed entry on a keyboard. After transmission of this code along lead 14, the data transmission from block 10 is again enabled. When this data stream is received at the other station, the data terminal thereat will recognize the special code and in the case of the earlier Teletypewriters, the terminal will cause the direct printing of alpha and numeric characters. The interface 12 does not effect the data stream from block 10 if there is no alpha-numeric change.

Data from lead 14 is introduced in a parallel manner to a parallel-serial converter 16 that is referred to as a UART. The abreviation stands for universal asynchronous receiver-transmitter. The UART 16 converts the parallel data at the input to serial data along output line 18. The serial data is then fed along line 20 to an FSK oscillator 22 that generates tones at two different frequencies, depending upon whether each bit in the serial data is a logic one or logic zero. The oscillator 22 is connected at its output to an acoustic coupler 24 that will receive a telephone receiver, in a conventional manner. The tones are transmitted over telephone lines to another station in accordance with telecommunication techniques. A record jack 26 is also connected to the output of oscillator 22. This jack permits a tape recorder to record the generated data for future playback.

In order to permit the keyboard operator to see the data he is generating, the charactes being entered in the keyboard are also displayed on a TV display, such as 43 or 45, as will be explained hereinafter. To accomplish this, during simultaneous transmission of the data via the acoustic coupler 24, the data is recirculated back through gate 30 to the UART 16. From there, the data undergoes a reverse conversion from serial to parallel data. The parallel data is introduced along line 34 to a Baudot/ASCII code converter 32 which converts from the Baudot to the ASCII code format, for internal processing. Parallel data, in ASCII, is transmitted from the converter 32 to connecting line 54 that inputs to block 38. The block includes a data memory and a subsequent character generator that converts the ASCII code to a video display character format. This conversion is explained in detail in connection with FIG. 1B of the previously referenced application. A video driver 40 serves as a signal mixer to form a composite video signal that can either be delivered to a TV monitor 45, via lead 44, or may be modulated by an RF oscillator 42. The latter approach permits the connection of the output of the RF oscillator, directly to the antenna terminals of a conventional home TV receiver 43, without modification of the receiver. Switch 46 determines what type of display is to be used. However, it is to be stressed that the invention per se does not include either the TV monitor 45 or the TV receiver 43. These are displays that are used in conjunction with the data terminal that comprises the present invention.

It is to be further stressed that although the present invention has been explained for use as a telecommunications system for the hearing impaired, the invention is not to be construed as being limited to this application. Rather, the present invention is applicable to all telecommunications applications where one requires a data terminal capable of communicating in two different codes.

Primary timing and control signals are generated from block 36. The circuitry involved in this block is essentially the cicuitry generally indicated by reference numeral 36 in FIG. 1B of our previous patent application. Minor departures include the deletion of a phase detector 136 and lowpass filter 138. In lieu of the previous voltage controlled oscillator 132, the crystal oscillator 88 (FIG. 1) is now used. Further, the previous character address counter 142 receives a data valid enabling signal from the present parallel-serial converter 16 (FIG. 1).

A clock 50 is connected to the Baudot/ASCII switch 48 and determines which one of two clock frequency rates will be generated at the output of the UART clock 50. Essentially, the output from this clock functions in a manner similar to the clock output along line 54 of our previous application, as shown in FIG. 1A thereof. It is necessary for the UART clock 50 to function in either one or another frequency because the UART 16 operates at different frequencies, depending upon whether the system communicates in Baudot or ASCII. A Baudot/ASCII control unit 52 has its input connected to the code selector switch 48. The control 52 connects the converter 32 between 34 and 54 when the Baudot switch 48 is set for Baudot operation. However, should the switch 48 be set for ASCII, the control 52 effectively shunts the converter 32 as indicated by the dotted line 56. This is necessary because the Baudot is converted to ASCII for internal processing. However, if the data terminal communicates in ASCII, this necessity no longer exists.

The ASCII/Baudot control 12 is basically an electronic switching circuit. to be discussed in greater detail hereinafter. The control 12 becomes particularly operative when the system is operating in Baudot. When the system is operating upon either alpha or numeric Baudot the keyboard interface 12 completes a shunt path 58 to provide direct communication of parallel data between the keyboard-switch matrix 10 and the UART. However, if the keyboard entries are changed from alpha to numeric, or vice-versa, in Baudot, the interface 12 will generate a code signifying this occurrence. In addition, the interface 12 interrupts the data transmission between the keyboard-switch matrix 10 and the UART 16 until this code has been received by UART. Thereafter, the data stream continues. When the system is communicating in ASCII, the interface 12 merely serves to close the path between the keyboard-switch matrix 10 and the UART 16. The interface 12 is receptive to the code by virtue of its connection to the selector switch 48.

With continued reference to FIG. 1, the utilization monitor 60, to be discussed in greater detail hereinafter, measures elapsed time that the unit is on. The monitor is in essence a counter which upon demand can transmit a count, corresponding to elaspsed time, for transmission through the terminal and eventually to the other station which makes a request for the elapsed time count. As indicated in FIG. 1, the utilization monitor output is introduced at 62, which is the input to the keyboard interface 12.

Thus far, the operation of the system has been described in a transmitting mode. The following discussion will relate to the receiving mode.

Receiver 64 is a block diagram illustration of circuitry that receives tone signals from a telephone, via an acoustic coupler. The receiver 64 includes the same circuitry as described and is shown in FIG. 1A of our previous application (14, 16, 18, 22 and 24). The receiver, once it detects a carrier from he phone lines, enables a reset control 66, which is comparable to the carrier detector 20, shown in FIG. 1A of the referenced application. The reset signal from 66 initiates operation of the UART 16.

Considering the input to receiver 64, the microphone 72 of an acoustic coupler is normally switched to the input 74 of receiver 64. The acoustic coupler picks up the audio data from a telephone receiver that is placed thereagainst. This is fully explained in connection with microphone 10 of FIG. 1A of the previously referenced application. Switch 75 may be switched from its normal position to disengage from the microphone 72 and engage the tape playback jack 70. Use of the jack 70 permits a tape recorder to be plugged into the system whereupon tape programmed material may be processed by the system and displayed on the video displays 43, 45. A phone status indicator 68 is connected to the receiver 64 and indicates the status of the phone lines when a hearing impaired person wishes to place a call. More particularly, the indicator 68 is a lamp that will display a particular light pattern for each status condition, such as dial tone, busy signal, etc. The indicator was referenced by 528 in FIG. 1A of the referenced application.

Data is received via phone lines, through the acoustic coupler microphone 72. The audio data is then translated to the receiver 64 which translates the audio tones to a digital pulse train at output 76. This output is conncted to line 28 which is an input line to the UART 16. Line 28 operates in the circuit as did line 24 in FIG. 1A of the referenced patent application.

When the data terminal is receiving data, one must known beforehand whether the data received is in Baudot or ASCII. The switch 48 is appropriately set, and the data from receiver 76 will then be handled by the UART 16 in the same manner that the parallel data was handled on line 14.

FIG. 2 of the present invention illustrates a circuit that alerts the hearing impaired person to the fact that his telephone is ringing. The circuitry shown in FIG. 2 is basically a sensor that picks up the telephone ring and causes energization of an indicator lamp. It is emphasized that the circuitry shown in FIG. 2 constitutes prior art. However, the concept of including the circuitry within a data terminal that is particularly suited for the hearing impaired is a novel concept.

An inductive pickup 78 is positioned adjacent or underneath a phone 79. When the phone rings, the inductive pickup 78 generates a signal that is transmitted to the ring indicator 80. The indicator includes filters for insuring valid detection of a ring. Also included in the indicator 80 is an oscillator that is enabled when valid ring is detected. The ring indicator is physically located within the data terminal for convenience, although this is not necessarily the case. For energization of the filter and oscillator circuits, the system power supply 82 is connected to the indicator 80. The oscillator portion of the indicator 80 generates a carrier that is connected to house power lines for superposition on the 60 Hz. power lines. A remote carrier receiver 84 is plugged into an ordinary power receptacle in the home. When the receiver 84 detects a carrier, the receiver 84 acts as a relay to connect the house power to a lamp 86 which may light continuously or in a blinking manner, thus indicating the occurrence of a telephone ringing. When a hearing impaired individual notices this occurrence, he may lift the receiver from a telephone cradle and place it in contact with the acoustic coupler to begin receipt of a data message.

Figure 3:
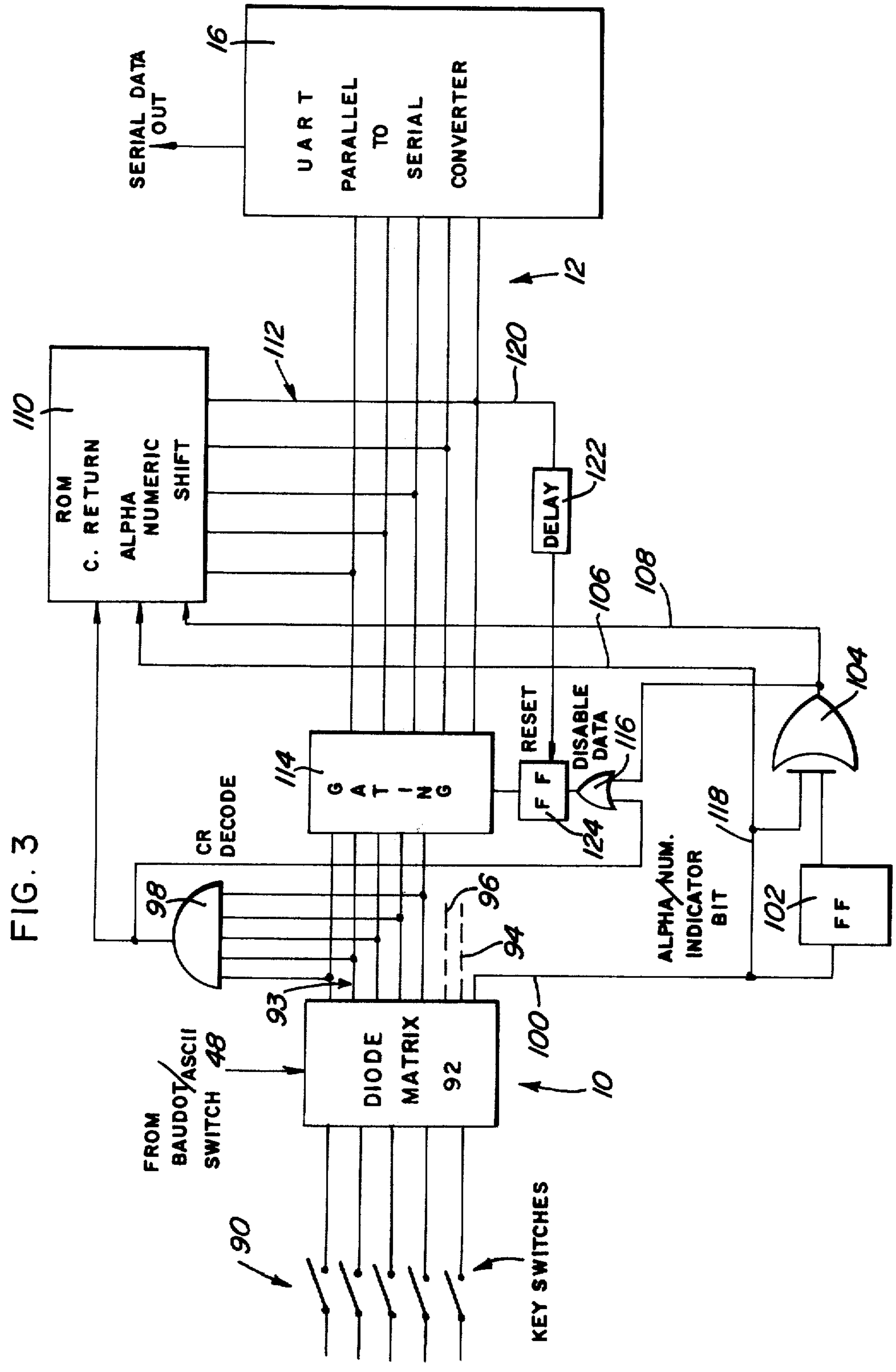
FIG. 3 is a logic diagram of the keyboard interface shown in FIG. 1.

FIG. 3 illustrates the circuitry in the keyboard interface 12. As will be noted, the individual switches of the keyboard are generally indicated by reference numeral 90. These switches are connected, in a conventional manner, to a diode matrix 92 that converts switch closures to codes that respectively correspond to the characters on the keyboard. Actually, the diode matrix 92 is comprised of two individual matrices which are selectively interposed in the circuit, depending upon the position of the code selector switch 48. Thus, if Baudot is selected, a first matrix will come into play so that Baudot code can be generated. On the other hand, if ASCII is selected, a second diode matrix will be selected to generate ASCII code characters. The particular matrix for each code conversion is derived from a truth table, in accordance with well known logic techniques. If Baudot is being generated by the diode matrix 92, a five level code output will appear at the output lines 93 of the matrix 92. If however, ASCII is utilized, two additional levels 94 and 96 appear from the diode matrix 92. A carriage return decoder 98 in the form of an AND gate will detect the occurrence of a carriage return entry on the keyboard. This will result in an output from the gate 98 which subsequently addresses the read only memory (ROM) 110. The ROM 110 then generates a five level output along output leads 112 that correspond to a carriage return code to be transmitted to the UART 16. The UART 16 then converts the parallel fed code to a serial output, the carriage return code being interposed in a data stream to be transmitted to the output of the data terminal.

In Baudot, an output 100 from the diode matrix 92 will carry an indicator bit that represents either an alpha or a numeric presently depressed character. A flip-flop 102 is also connected to this output and is actuated when there is a change in entry from an alpha to a numeric character, and vice-versa. The output of the flip-flop 102 provides a first input to a comparator gate 104 which detects this occurrence. A second input to the comparator gate 104 exists along line 118. The output 108 from the comparator 104 furnishes a second access to the ROM 110 thereby causing the ROM to generate a second special code indicative of an alpha-numeric or numeric-alpha character change between two successive keyboard entries. The code from the ROM is then transmitted to the UART 16 for further transmission to the data terminal output. Line 118, connected to the diode matrix output 100, is directly connected to the ROM 110 via line 106. This line furnishes information as to whether the shift was from alpha-numeric or vice-versa. This entry is necessary in order to generate the proper shift code in the ROM.

With further reference to FIG. 3, a gating circuit 114 is shown to be interposed between the diode matrix 92 and the UART 16. The gating 114 will enable the passage of Baudot code data therethrough when there is no change from alpha-numeric characters. However, as soon as such a change occurs, or in the event a carriage return or line feed has been generated on the keyboard, the gating 114 disables the flow of data therethrough until the ROM 110 has a chance to interpose its special code signifying the change. A simple gating circuit is employed to close the gating circuit 114 thereby terminating transmission of data therethrough. To accomplish this, a disable data gate 116 has its first input connected to the output of the carriage return decode gate 98. A second input to the disable data gate 116 is connected to the output of comparator 104. The disable data gate 116 is an OR gate that will be set when either input is high. This will cause the flip-flop 124 to be set thereby disabling the gating circuit 114 and terminating data transmission for a moment. During this time, the ROM 110 has an opportunity to inject its special function code on the lines 112. The least significant bit 120 of the ROM output is delayed by 122 to insure the complete transmission of the ROM output to the UART 16. After passing through delay 122, the least significant bit forms a reset input to the flip-flop 124 which once again enables the gating circuitry 114. As a result, the data is free to flow to the UART 16.

Figure 4:
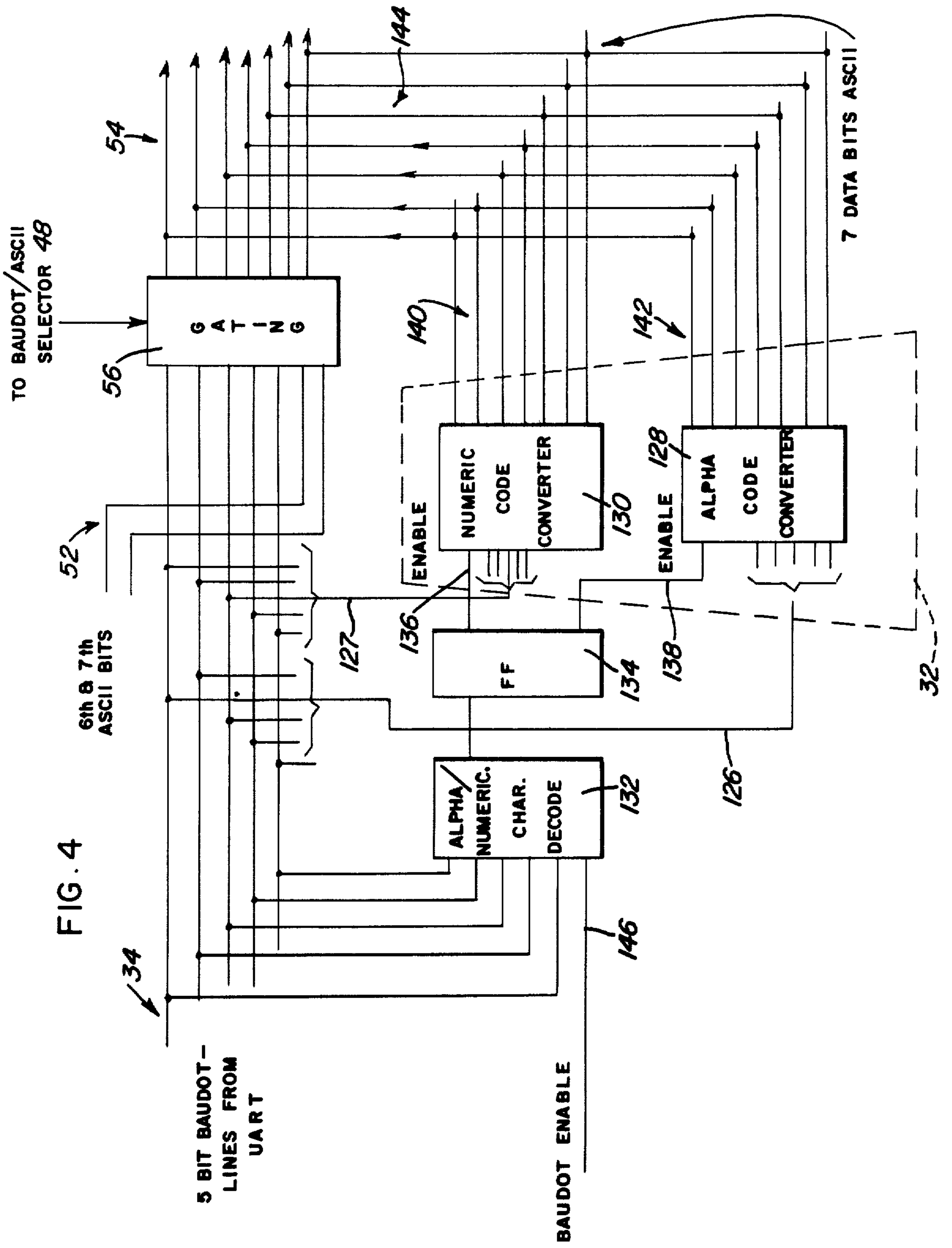
FIG. 4 is a schematic block diagram of the code converter shown in FIG. 1.

Referring to the circuitry of FIG. 4, the control unit 52 and its relationship with the code converter 32 are shown in detail. When the terminal is transmitting in Baudot, five data levels are introduced at 34. Each of the lines at 34 are introduced into an alpha-numeric character decoder 132 which determines whether a particular entered character is alpha or numeric. The output from the decoder 132 actuates a flip-flop 134 that will assume one or another state depending upon whether an alpha or numeric character has been entered in the keyboard. The output in the flop-flop 134 will enable a corresponding code converter 128 or 130. These converters comprise the previously discussed code converter 32 in FIG. 1. The code converter 32 will change five level Baudot introduced at input lines 126 and 127 to seven level ASCII. If an entered Baudot character on line 34 is an alpha numeral, the numeric code converter 130 is enabled at line 136 which causes the generation at lines 140 of an ASCII code character corresponding with the entered Baudot character. Interconnecting lines 144 convey the ASCII character to the parallel data lines 54, which is illustrated in FIG. 1. In a similar manner, if an alpha Baudot character is entered on the keyboard it will exist on input lines 34, and will subsequently enable the code converter 128 along the enabling input line 138. This time, the output lines 142 of the converter 128 will carry the ASCII equivalent of the Baudot alpha character, this ASCII character to be transmitted to the output lines 54, via connecting lines 144. The alpha-numeric character decoder 132 is enabled by line 146 which is connected to the selector switch 48 in FIG. 1. If the selector switch is thrown to the ASCII position to accommodate ASCII code communication, the character decoder 132 will be disabled thereby cutting out the operation of converter 32 and instead allow direct transmission of Baudot characters to the input of gating circuitry 56, that was previously indicated as a path shunting the code converter 32 shown in FIG. 1.

Figures 5, 6:
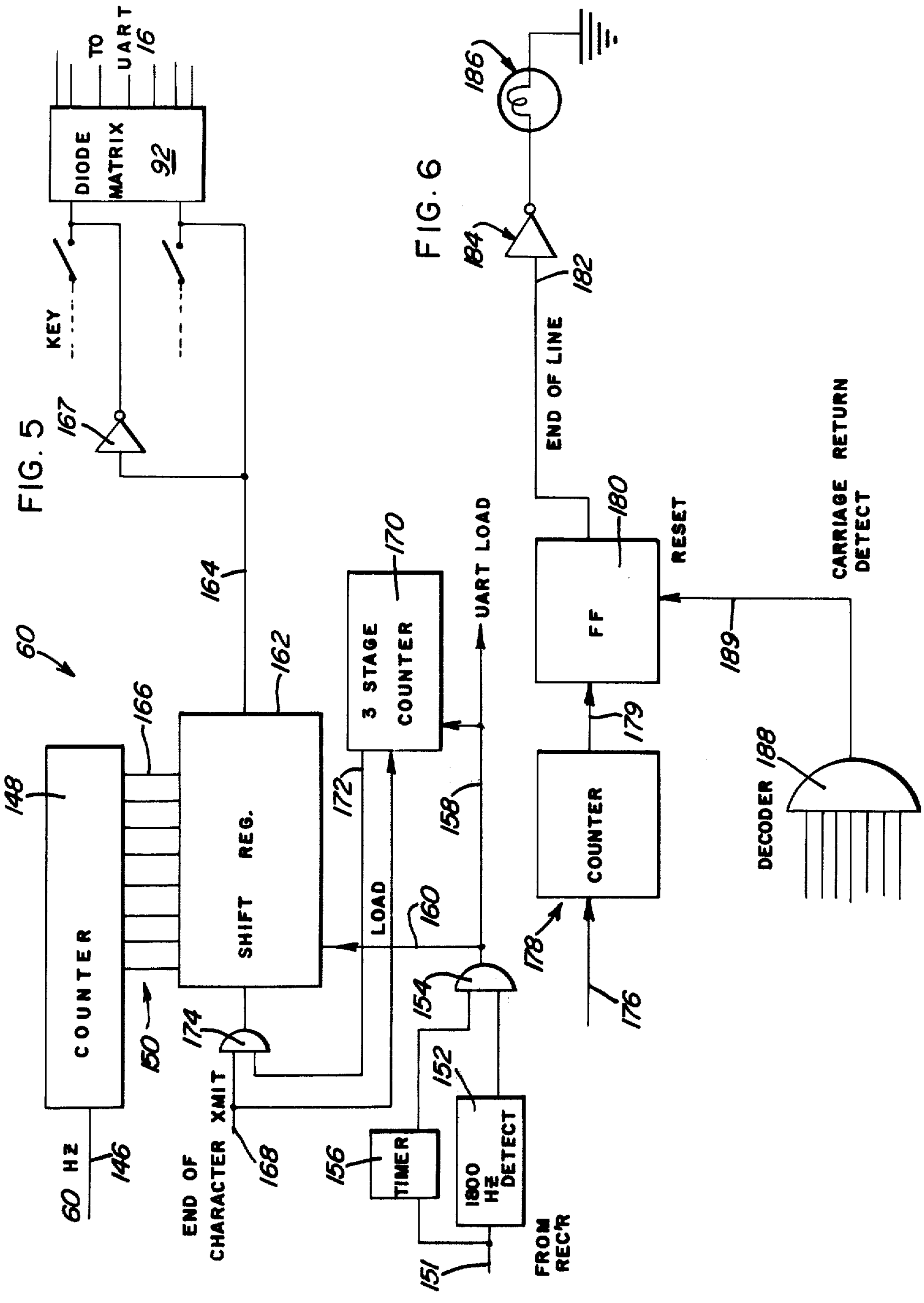
FIG. 5 is a logic diagram of an utilization monitor.
FIG. 6 is a logic diagram of the end of line indicator.

FIG. 5 illustrates the logic circuitry for the utilization monitor that was previously denoted by 60 in FIG. 1. The counter measures elapsed time for actual use of the data terminal. The inclusion of a utilization monitor may be desirable when the data terminal is rented to the customer on a usage basis. As shown in the figure, a 60 Hz signal is applied along lead 146 to a counter 148. The counter has eight output lines generally indicated by reference numeral 150. The lines correspond to eight bits of counter data. The counter 148 steps up incrementally as the 60 Hz signal is applied to the counter 148.

The utilization monitor becomes operative when an interrogation signal is applied by an interrogating station through the receiver 64 (FIG. 1). The received signal enters the utilization monitor along line 151 to be detected by an 1,800 Hz detector 152. This frequency represents a logic zero for data transmitted through the acoustic coupler of the invention. When this signal has been detected at 152 and exists for a sustained period, for example 1.5 seconds, as detected by timer 156, the OR gate 154 is enabled and a load signal is produced from the gate 154 along lines 158 and 160. The signal along lines 158 is a UART load signal which starts the utilization monitor readout cycle by providing an input to the UART 16 along the lead 14, as shown in FIG. 1. Simultaneous with this, a load signal is applied along lead 160 that causes the shift register 162 to parallel load the counter data via lines 150. The most significant bit 166 is correspondingly dumped into the shift register 162 so that first the most significant bit is transmitted from the shift register 162 along line 164 to the diode matrix 92. A second parallel path to the diode matrix 92 is presented through the interposing connection of an inverter 167. The effect of these inputs to the diode matrix 92 is the equivalent of a keyboard depression of either a logic zero or a logic one depending upon the logic value of the most significant bit. The diode matrix 92 transmits the bit to the UART 16 where it is then fed through the remainder of the data terminal and to arriving at the acoustic coupler speaker 24 for transmission to the interrogating station. The UART 16 will generate an end of character transmit signal after this occurs, along lead 168. The signal causes the right shift of the second most significant bit through the data terminal in a similar manner. The process is repeated until all eight bits dumped from counter 148 are serially read from the shift register 162. As each end of character transmits signal is applied at 168, it is likewise applied to a three stage binary counter 170 which counts up to binary eight. When this count occurs, the entire data stored in shift register 162 has been read out to the interrogating stations. Then, a signal 172 is fed from the counter 170 to a gate 174 thereby disabling further shifting from register 162. The end result is the transmission of the counter data to the interrogating station which reconstructs the data to indicate elapsed time of usage for the transmitting data terminal. Simultaneously, this data is displayed at 43 or 45 (FIG. 1).

FIG. 6 illustrates the logic circuitry that is employed in the present invention to indicate when a machine operator approaches the end of a line during keyboard operation. In this respect, the visual indicator utilized is analogous to the warning bell used on conventional typewriters, when the end of a line is approached. An input lead 176 is connected to a divider-counter 178. The input lead 176 carries incremental signals as a result of sequential keyboard operation between carriage returns. These signals are obtained from the timing control unit 36. Referring to our previous application, these signals were obtained from the character address counter 142 shown in FIG. 1B. When a preselected count is accumulated in the counter 178, indicating the approach of the end of the line, the most significant bit in the counter is actuated thereby setting the counter output 179 high. This causes the actuation of a flip-flop 180 that in turn generates an end of line signal along lead 182. A buffer 184 is connected in this line, the purpose of the buffer is to drive an indicator lamp 186. When the machine operator notes that the indicator light 186 is on, he may depress the carriage return key on the keyboard which will be detected by the decoder gate 188. An output is produced along line 189 for the purpose of resetting the flip-flop 180.

It must again be stressed that although the previous text was particularly directed to an application of the present invention to a telecommunication terminal for the hearing impaired, it must be remembered that the invention may also be adapted to other applications where selective communication of two codes exists.

It should be understood that the invention is not limited to the exact details of construction shown and described herein for obvious modifications will occur to persons skilled in the art.

What is claimed is:

1. In a telecommunication data terminal for selectively transmitting data in one of at least first and second codes, the terminal comprising:

code select switch means;

means for entering data into the terminal;

means connected to the data entry means for encoding the entered data in accordance with the selected code;

interface means connected between the data entering means and the encoding means, said interface means responsive to the code select switch means, for interposing a special indication when the first code is selected and there is a change from alpha to numeric characters and vice versa;

clock means connected at the input thereof to the switch means for generating timing signals which control the data rate from the encoding means in accordance with the selected code;

transducer means connected to the output of the encoding means for coupling encoded data to a telephone for transmission over telephone lines to another station at a data rate determined by the clock means;

means for visually displaying the entered data at the terminal as it is transmitted to another station, the displaying means including:

means connected to the output of the encoding means and the code select switch means for converting encoded data in the first code format to the second code format for internal processing;

memory means connected to the converting means for storing the data therefrom;

means connected to the output of the memory means for generating video data therefrom corresponding to the entered data;

means for generating video display synchronizing signals;

signal mixing means for mixing the video data with video synchronizing signals and producing a composite video signal; and output means whereat the composite signal is present for connection to a video display which displays the entered data.

2. The telecommunication terminal for transmitting and receiving data in one of at least first and second codes, the terminal including a transmitting portion comprising;:

code select switch means;

means for entering data into the terminal;

means connected to the data entry means for encoding the entered data in accordance with the selected code;

interface means connected between the data entering means and the encoding means, said interface means responsive to the code select switch means, for interposing a special indication when the first code is selected and there is a change from alpha to numeric characters and vice versa;

clock means connected at the input thereof to the switch means for generating timing signals which control the data rate from the encoding means in accordance with the selected code;

transducer means connected to the output of the encoding means for coupling encoded data to a telephone for transmission over telephone lines to another station at a data rate determined by the clock means;

means for visually displaying the entered data at the terminal as it is transmitted to another station, the displaying means including:

means connected to the output of the encoding means and the code select means for converting encoded data in the first code format to the second code format for internal processing;

memory means connected to the converting means for storing the data therefrom;

means connected to the output of the memory means for generating video data therefrom corresponding to the entered data;

means for generating video display synchronizing signals;

signal mixing means for mixing the video data with video synchronizing signals and producing a composite video signal; and output means whereat the composite signal is present for connection to a video display which displays the entered data;

the terminal further including a receiving portion comprising:

second transducer means for coupling data into the terminal from a telephone, the data being transmitted from another station;

the converting means connected at inputs thereof during the receive mode to the code select switch and the coupled telephone data for converting the data in the first code format to the second code format;

the memory means being connected to the converting means when the terminal is in a receiving mode for storing the data from the converting means;

the generating means functioning during the receive mode to generate video data from the memory means;

the video display synchronizing signals operating with the signal mixing means during the receive mode for mixing the video data with video synchronizing signals to produce a composite video signal;

the output means, whereat the composite signal is present during the receive mode, serving as a connection point to a video display which displays the received data.

3. The subject matter as defined in claim 2, wherein the means for entering data comprises a keyboard for manual entry of data.

4. A telecommunication terminal for transmitting data in either Baudot or ASCII code whereby switching between alpha and numeric characters requires the insertion of a special function code in a data stream, the terminal including a transmitting portion comprising:

keyboard means for entering data into the terminal;

means connected to the keyboard means for encoding the entered data in accordance with a selected code;

keyboard interface means connected to the output of the encoding means for permitting the direct transmission of data therethrough when the terminal is transmitting in ASCII, the interface means temporarily disabling data flow and inserting a special function code in a data stream when an alphanumeric change occurs while the terminal is operating in Baudot;

Baudot-ASCII selector switch means connected to the interface means for governing operation of the interface in accordance with a selected code;

parallel to serial converting means for serially feeding data in the selected code from the interface means to an acoustic coupler whereat the data may be further transmitted to another station from a telephone cooperating with the acoustic coupler;

the terminal further including means for visually displaying the keyboard entry data as it is transmitted to the other station, the display means including:

means connected to the output of the encoding means for converting Baudot encoded data to an ASCII code format for internal processing;

the selector switching means connected to the Baudot-ASCII converting means for directly transmitting encoded data through the Baudot-ASCII converting means when the terminal is selected for ASCII communication;

memory means connected to the Baudot-ASCII converting means for storing the data therefrom;

means connected to the output of the memory means for generating video data therefrom corresponding to the entered data;

means for generating video display synchronizing signals;

signal mixing means for mixing the video data with video synchronizing signals and producing a composite video signal; and output means whereat the composite signal is present for connection to a video display which displays the entered data.

5. The subject matter as defined in claim 4 wherein the terminal further includes circuitry for receiving data from another station in either Baudot or ASCII code, the receiving circuitry comprising:

means connecting the acoustic coupler to the parallel to serial converting means for communicating the received data into the terminal via a telephone at the receiving station;

the parallel to serial converting means connected at inputs thereof during the receive mode to the code select switch means and the coupled telephone data;

means connecting the output of the parallel to serial converting means to the Baudot-ASCII converting means for converting received Baudot data to ASCII format;

the memory means being connected to the converting means when the terminal is in a receiving mode for storing the data from the Baudot-ASCII converting means;

the generating means functioning during the receive mode to generate video data from the memory means;

the video display synchronizing signals operating with the signal mixing means during the receive mode for mixing the video with video synchronizing signals to produce a composite video signal; and the output means whereat the composite signal is present during the receive mode serving as a connection point to a video display which displays the received data.

6. The subject matter as defined in claim 4 together with a utilization monitor for measuring elapsed time of terminal usage, the monitor comprising:

counter means for incrementing an accumulated count when the terminal is energized;

means responsive to receipt of data from a remote station indicating operation of the terminal in the receiving mode;

means connected to the output of the responsive means for enabling readout of the counter means to storing means when the responsive means becoms operative; and means connected to the output of the storing means to the encoding means for encoding the count in a preselected code corresponding to elapsed time of terminal use, the count being subsequently presented to the output means as ordinary data for display on a video display.

7. The claim as set forth in claim 5 together with a utilization monitor for measuring elapsed time of terminal usage and communicating the measurement to a remote interrogating station, the monitor comprising:

counter means for incrementing an accumulated count when the terminal is energized;

means responsive to receiving a preselected signal, lasting a preselected time duration, from a remote interrogating station;

means connected to the output of the responsive means for enabling readout of the counter means to storing means when the responsive means becomes operative; and means for connecting the storing means to the encoding means for encoding the count in the preselected code, corresponding to elapsed time of terminal use, the count being subsequently transmitted via the coupling means to the interrogating station as ordinary data.

8. The subject matter as defined in claim 5 together with an end of line indicator comprising:

means for counting the number of entries entered on the keyboard means;

switching means connected to the output of the counting means for switching to a determinative state when a preselected count has accumulated which corresponds to an end of line condition on a video display; and indicator means connected to the output of the switching means for altering a terminal keyboard operator of an end of line condition.

9. The subject matter as set forth in claim 5 together with a telephone ring indicator comprising:

means responsive to the ring of a telephone for generating a corresponding electrical signal;

means located in the terminal and connected to the output of the generating means for producing a carrier signal when the telephone rings;

means connecting the carrier producing means to regular house power lines for transmitting the carrier signal therealong;

receiving means located outside the terminal and connected to the house power lines for connecting the power lines to a visual indicator remote from the terminal upon receiving the carrier signal.

* * * * *